(12) United States Patent
Haro et al.

(10) Patent No.: US 9,788,163 B2
(45) Date of Patent: *Oct. 10, 2017

(54) APPARATUS AND METHOD FOR INCREASING ACCURACY OF LOCATION DETERMINATION OF MOBILE DEVICES WITHIN A LOCATION-BASED GROUP

(71) Applicant: Life360, Inc., San Francisco, CA (US)

(72) Inventors: Alexander Haro, San Francisco, CA (US); Christopher Hulls, Point Reyes, CA (US); Michael Borsuk, San Francisco, CA (US); Michael Hood, San Francisco, CA (US); Ajna Cackovic, San Francisco, CA (US)

(73) Assignee: LIFE360, INC., San Francisco, CA (US)

( * ) Notice: Subject to any disclaimer, the term of this patent is extended or adjusted under 35 U.S.C. 154(b) by 474 days.

This patent is subject to a terminal disclaimer.

(21) Appl. No.: 14/023,225

(22) Filed: Sep. 10, 2013

(65) Prior Publication Data

US 2015/0018019 A1    Jan. 15, 2015

Related U.S. Application Data

(60) Provisional application No. 61/842,344, filed on Jul. 2, 2013.

(51) Int. Cl.
*H04W 4/02* (2009.01)
*G01S 5/02* (2010.01)

(52) U.S. Cl.
CPC .......... *H04W 4/028* (2013.01); *G01S 5/0284* (2013.01); *H04W 4/02* (2013.01)

(58) Field of Classification Search
CPC  H04W 4/028; H04W 4/02; G01S 5/00; G01S 5/0284

(Continued)

(56) References Cited

U.S. PATENT DOCUMENTS 7,840,226 B1 * 11/2010 Walsh .................. H04L 63/107
                                                          379/142.05
8,428,098 B2    4/2013 Chen et al.
(Continued)

FOREIGN PATENT DOCUMENTS

| JP | 2007201921 | 9/2002 |
| JP | 2002257564 | 11/2002 |
| WO | 03091873 A1 | 11/2003 |

OTHER PUBLICATIONS

PCT/US2014/044456 Written Opinion of the International Searching Authority and International Search Report dated Sep. 26, 2014.

(Continued)

*Primary Examiner* — Kamran Afshar
*Assistant Examiner* — Minjung Kim
(74) *Attorney, Agent, or Firm* — Blakely Sokoloff Taylor & Zafman LLP

(57) ABSTRACT

A method of increasing accuracy of location determination of mobile devices within a location-based subgroup starts with server receiving location data and proximity information from each of the mobile devices. Location data received from first mobile device includes first mobile device's fixed location. Proximity information received from first mobile device includes an identification of mobile devices within a proximity sensitivity radius of first mobile device's location. Server forms subgroup of mobile devices based on proximity information from each of the mobile devices. Subgroup may include first mobile device and mobile devices that have provided proximity information that identifies first mobile device are being within the proximity sensitivity radiuses of the mobile devices, respectively. Server may then refine the fixed location of the first mobile device, which includes identifying an intersection of the proximity (Continued)

sensor sensitivity of each of the mobile devices that are in subgroup. Other embodiments are described.

18 Claims, 7 Drawing Sheets

(58) Field of Classification Search
USPC ......... 455/456.1, 456.2, 456.3, 456.4, 456.5, 455/456.6, 457
See application file for complete search history.

(56) References Cited

U.S. PATENT DOCUMENTS

| | | | |
|---|---|---|---|
| 8,433,324 | B2 | 4/2013 | Tang |
| 8,436,773 | B2 | 5/2013 | Seibert |
| 8,436,901 | B2 | 5/2013 | Uhm |
| 8,437,972 | B2 | 5/2013 | Ploplys et al. |
| 8,438,156 | B2 | 5/2013 | Redstone et al. |
| 8,639,757 | B1 * | 1/2014 | Zang ..................... G06Q 50/01 709/204 |
| 8,666,373 | B2 | 3/2014 | Dessouky et al. |
| 2004/0002346 | A1 * | 1/2004 | Santhoff ............... G01S 5/0045 455/456.1 |
| 2008/0032705 | A1 | 2/2008 | Patel et al. |
| 2008/0248815 | A1 * | 10/2008 | Busch ..................... H04W 4/02 455/456.5 |
| 2008/0268869 | A1 | 10/2008 | Lamba et al. |
| 2009/0009398 | A1 | 1/2009 | Taylor et al. |
| 2009/0201850 | A1 * | 8/2009 | Davis et al. .................. 370/328 |
| 2010/0234044 | A1 | 9/2010 | Lohbihler |
| 2011/0066398 | A1 | 3/2011 | Troxler et al. |
| 2011/0134240 | A1 | 6/2011 | Anderson et al. |
| 2011/0161855 | A1 * | 6/2011 | Prehofer ........... H04M 1/72572 715/771 |
| 2011/0171973 | A1 | 7/2011 | Beck et al. |
| 2011/0282799 | A1 | 11/2011 | Huston |
| 2012/0235865 | A1 | 9/2012 | Nath et al. |
| 2012/0246195 | A1 | 9/2012 | Mcfall |
| 2012/0329484 | A1 | 12/2012 | Rothschild |
| 2013/0095854 | A1 | 4/2013 | Scales |

OTHER PUBLICATIONS

Office Action for European Patent Application No. 14 742 651.4 dated Oct. 12, 2016.

* cited by examiner

APPARATUS AND METHOD FOR INCREASING ACCURACY OF LOCATION DETERMINATION OF MOBILE DEVICES WITHIN A LOCATION-BASED GROUP

CROSS-REFERENCE TO RELATED APPLICATIONS

This application claims the benefit of U.S. Provisional Patent Application No. 61/842,344 filed Jul. 2, 2013.

FIELD

Embodiments of the invention relate generally to an apparatus and method of increasing the accuracy of determining the location of mobile devices within a location-based group.

BACKGROUND

Currently, smart mobile phones and other mobile devices include mapping applications that may be used to show the user of the mobile device his current location on the mobile device's display. These applications may also be used to navigate the user to a destination based on his current location to a given destination. In some applications, the user's location is tracked and onscreen and audio directions are provided to the user.

However, the functionality of these mapping applications suffers when the user's location cannot be fixed accurately using sensors, WiFi and GPS. For instance, the display of the user's location which cannot be accurately fixed may jump from one location to the next (e.g., rapid phantom jumps) as the user moves. In order for the display of the user's location as he moves to appear as a smooth linear location change, a more accurate location fixing and tracking of the mobile device is needed.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

In the description, certain terminology is used to describe features of the invention. For example, in certain situations, the terms "component," "unit," "module," and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. The software may be stored in any type of machine-readable medium.

Figure 1:
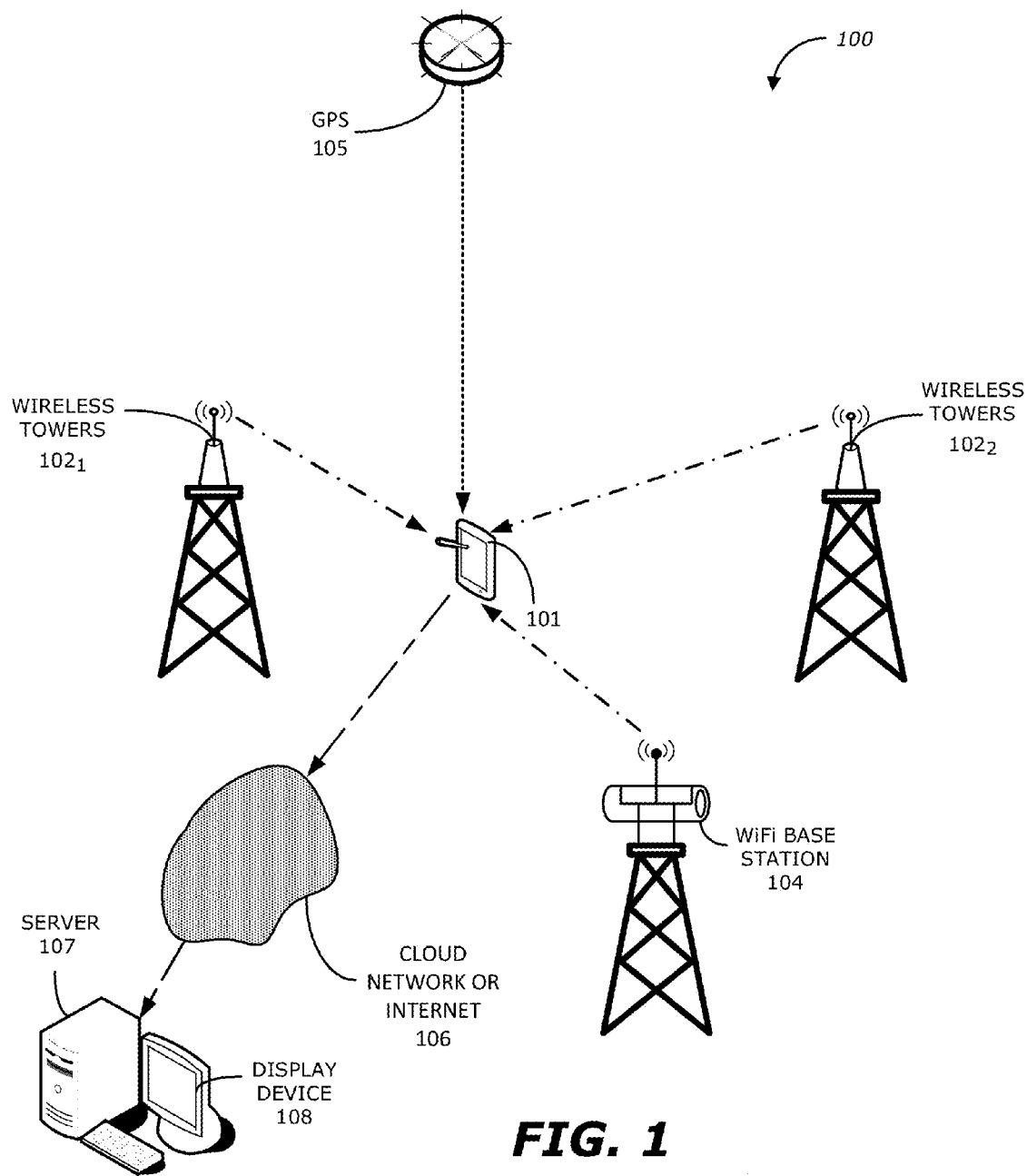
FIG. 1 illustrates a prior art system for tracking the location of mobile devices.

FIG. 1 illustrates a prior art system for tracking the location of mobile devices. The system 100 illustrates a mobile device 101 being tracked which may be portable computers such as laptop, notebook, tablet, and handheld computers or may also take the form of other types of devices, such as mobile telephones, media players, personal data organizers, handheld game platforms, cameras, and/or combinations of such devices. The tracking server 107 included in the system 100 links to the registered mobile device 101 over a network 106 (e.g., Cloud Network or Internet) to collect and transfer location data. Specifically, the server 117 requests location data from the mobile device 101 in order to display the location of the mobile device 101 on the display device 108. The mobile device 101 may extract its location data upon receiving the request from the server 107 by using its internal sensors and radios and by connecting to the Global Positioning System (GPS) 105. The mobile device 101 may also extract its location data by using its internal sensors and radios and by triangulation using the Wireless (WiFi) towers $102_1$, $102_2$ and/or WiFi base station 104. The location data from mobile device 101 is generated and transmitted to the tracking server 107 over the network 106.

Figure 2:
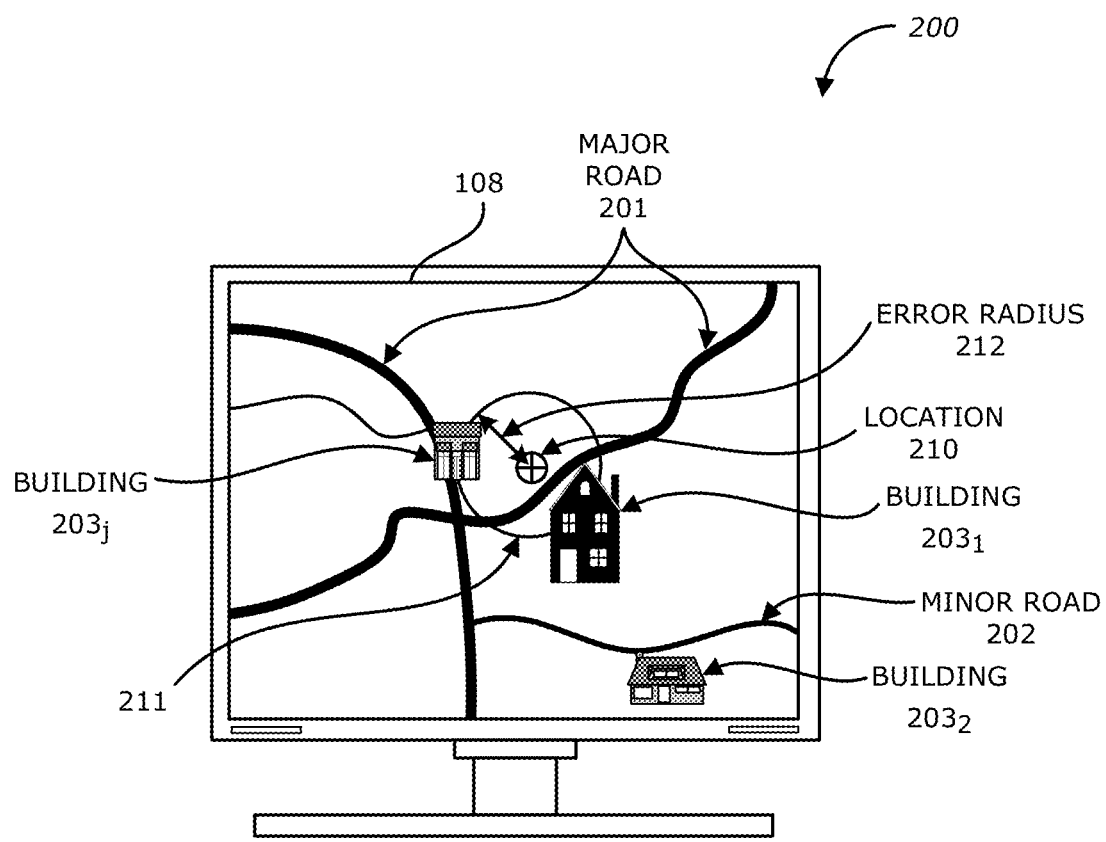
FIG. 2 illustrates the displayed location of the mobile device using the prior art system for tracking the location of mobile devices.

FIG. 2 illustrates a displayed location of the mobile device 101 using the prior art system for tracking the location of mobile devices. The display 200 on a display device 108 includes a representation a map with major roads 201, minor roads 202 and buildings $203_1$-$203_j$ (j>2). The map also includes the location 210 of the mobile device 101. In this prior system 100, the location 210 is not accurate but rather it is located within the location fixing accuracy of the mobile device's sensor and may further be affected by the reflections from the mobile device 101's surroundings. FIG. 2 illustrates the sensor sensitivity or sensor accuracy limit 211 of the mobile device 101. The possible error in the location of mobile device 101 can be as much as the area within the sensor error radius 212. Accordingly, actual location of the mobile device 101 may be anywhere within the area having an error radius 212. Therefore, even when the mobile device 101 is within the building $203_1$ as shown in FIG. 2, the location of the mobile device 101 can be shown on display device 108 as being outside of the building $203_1$. Similarly, it may be difficult to judge the location of the device 101 since both buildings $203_1$ and $203_j$ fall within the error radius 212 of the sensitivity of the sensor included in mobile device 101.

Accordingly, it may be useful to have a method and system that can provide a much more accurate location determining capability by refining the identified location for many of the current and future applications such as Geo-Fencing.

Figure 3:
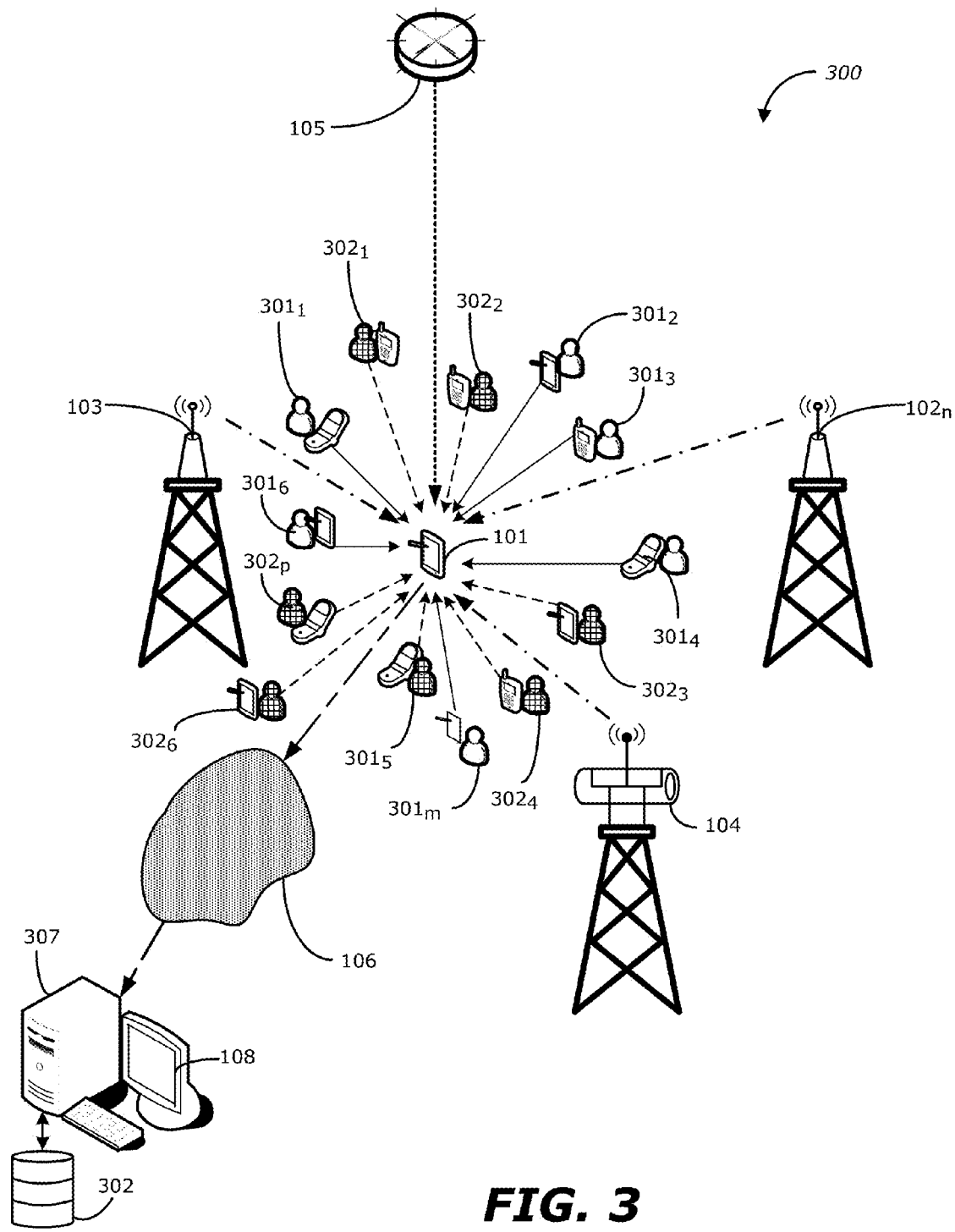
FIG. 3 illustrates a system for increasing accuracy of a location determination of mobile devices within a location-based subgroup according to an embodiment of the invention.

FIG. 3 illustrates a system for increasing accuracy of a location determination of mobile devices within a location-based subgroup according to an embodiment of the invention. In FIG. 3, the system 300 includes the plurality of mobile devices $301_1$-$301_m$ (m>1), and $302_1$-$302_p$ (p>1). The mobile devices may be combined in groups that are explicitly registered and linked with a server 307 that tracks the location of the mobile devices. The mobile devices $301_1$-$301_m$ (m>1) may form a first explicit group and the mobile devices $302_1$-$302_p$ (p>1) may form a second explicit group. In one embodiment, the first explicit group may include the mobile devices $301_1$-$301_m$ that are members of a social networking group and that are being tracked by their location. For instance, the membership to these social networks include registration with one or more central servers as part of explicit groups, such as family group, friends group, extended family and friends group, sport and club groups etc. Moreover, the combinations of the first and second explicit groups may also form implicit groups of mobile devices that have common properties but are not linked by an explicit registration for tracking. For instance, implicit groups include all registered devices, all members of a club, etc.

Figure 4:
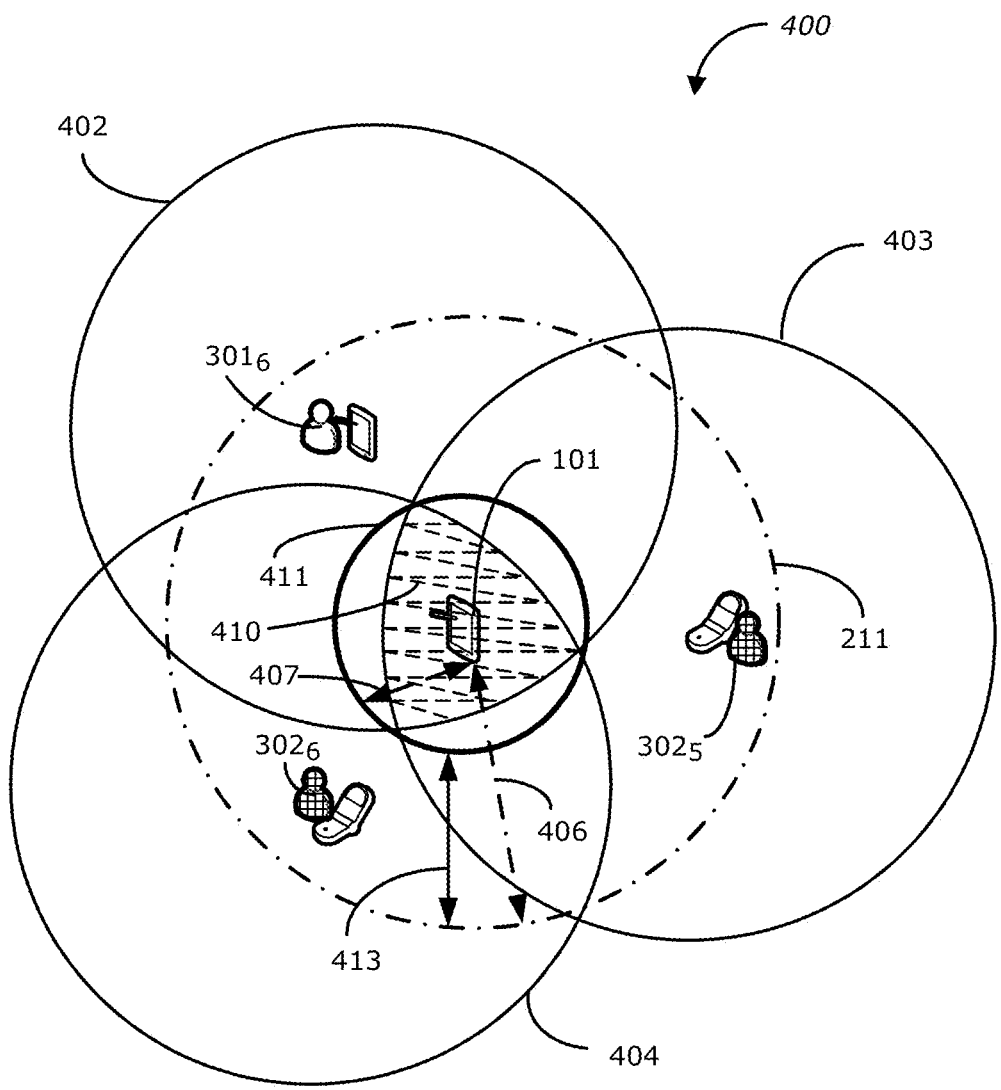
FIG. 4 illustrates the details of the system for increasing accuracy of a location determination of mobile devices within a location-based subgroup according to one embodiment of the invention.

Similar to FIG. 1, the tracking server 307 included in the system 300 also links to each of the registered mobile devices over a network 106 (e.g., Internet, Cloud Network) to collect and transfer location data and proximity information. Specifically, the server 307 may request location data and the proximity information from each of the mobile devices 101, $301_1$-$301_m$, and $302_1$-$302_p$. For instance, the location data received from a first mobile device 101 includes a fixed location of the first mobile device 101. The mobile devices 101, $301_1$-$301_m$, and $302_1$-$302_p$ may extract their location data, respectively, upon receiving the request from the server 307 by using its internal sensors and radios and by connecting to the Global Positioning System (GPS) 105. The mobile devices 101 $301_1$-$301_m$, and $302_1$-$302_p$ may also extract their location data, respectively, by using its internal sensors and radios and by triangulation using the Wireless (WiFi) towers $102_1$, $102_2$ and/or WiFi base station 104. Moreover, the proximity information received from the first mobile device 101 may include an identification of mobile devices that are within a proximity sensitivity radius of the first mobile device 101. Referring to FIG. 4, which illustrates the details of the system 300 for increasing accuracy of a location determination of mobile devices within a location-based subgroup according to one embodiment of the invention, the first mobile device 101 has a proximity sensitivity radius of 406 such that the proximity information received by the server 307 from the first mobile device 101 may include an identification of the proximate mobile devices being mobile devices $301_6$, $302_5$, and $302_6$.

As shown in FIG. 4, the fixed location of mobile device 101 is within the first device's 101 sensor accuracy limit 211 which has a proximity sensor sensitivity radius (or error radius) 406. Similarly, the fixed location of mobile device $301_6$ is within its sensor accuracy limit 402, mobile device $302_5$ is within its sensor accuracy limit 403 and mobile device $302_6$ is within sensor accuracy limit 404. In some embodiments, the server 307 may perform a proximity check which includes assessing the proximity information from each of the mobile devices 101, $301_6$, $302_5$, and $302_6$ to determine and confirm that each of the mobile devices $301_6$, $302_5$, and $302_6$ are proximate in location to the first mobile device 101. For instance, the server 307 may check that first mobile device 101 is identified in the proximate information from the mobile devices $301_6$, $302_5$, and $302_6$ which indicates that mobile device 101 is within the proximity sensor sensitivity radius of each of the mobile devices $301_6$, $302_5$, and $302_6$. If the four devices are found to be in the proximity of each other using the proximity check, these devices can be considered to be in close by locations to or same location as the mobile device 101. In some embodiments, the mobile devices $301_6$, $302_5$, and $302_6$ that are found to be proximate to the first mobile device 101 may also be from the first mobile device 101's implicit and/or explicit groups.

In one embodiment, the server 307 forms a subgroup of mobile devices that includes the mobile devices $301_6$, $302_5$, and $302_6$ that provided proximity information identifying the first mobile device 101 are being within the proximity sensitivity radiuses of the mobile devices, respectively. In some embodiments, the subgroup may also include the first mobile device 101. Using the subgroup, the server 307 may then refine the fixed location of the first mobile device 101 to generate a refined location of the first mobile device 101. In one embodiment, as shown in FIG. 4, the refining of the fixed location of first mobile device 101 includes identifying an intersection 410 of the proximity sensor sensitivity of each of the mobile devices 101, $301_6$, $302_5$, and $302_6$ that in the subgroup. Accordingly, it is determined that in order for the first device 101 to be identified as proximate to devices in the subgroup, the location of the first device 101 is location within the intersection 410. Thus, the server 307 is able to obtain a refined location (e.g., within intersection 410) for the first mobile device 101. More specifically, rather than being based on only the first device's 101 accuracy limit 211, the server 307 is able to refine the location of the first device 101 within an accuracy limit 411 and eliminate the ring area of a distance 413 around the accuracy limit 411 as a potential location for the first mobile device 101. The new error radius 407 now associated with the first mobile device 101 is much smaller than the first mobile device 101's proximity sensitivity radius 406.

In one embodiment, in order to further refine the fixed location of the first device 101, the server 307 may determine if a database 305 in FIG. 3 includes a location that is associated with the first mobile device 101 and that is within the intersection 410 or within a predetermined distance from the intersection 410. Alternatively, rather than being separate from the server 307, the database being checked for a location that is associated with the first mobile device 101 may also be a database 630 (FIG. 6) that is included in the server 307. Location data associated with each of the mobile devices in the system 300 may be collected by the server 307 which stores the data in a database memory 305/630. Referring back to FIG. 4, the location associated with the first device 101 may include at least one of: (i) an explicit group location that is associated with an explicit group that includes the first mobile device 101, (ii) an implicit group location that is associated with an implicit group that includes the first mobile device 101, and (iii) a historic location that is associated with the first mobile device 101, wherein the historic location is a location previously frequented by the first mobile device 101.

The explicit group location and the implicit group location may respectively be locations where members of the explicit and implicit groups congregate such as clubs, schools, colleges, places of worship, sport facilities etc. As shown in FIG. 4, the subgroup 101, 301$_6$, 302$_5$, 302$_6$ may include registered members from both explicit and implicit members that are proximate to mobile device 101. Though the subgroup in FIG. 4 is shown to include different mobile users, it is understood that the subgroup may be formed of multiple mobile devices belonging to a single user (e.g., tablet computers, mobile phones, smart watches etc.) in conjunction with other mobile devices identified by the proximity sensors of the mobile devices. Moreover, the historic location may be, for instance, a club, a school, a library or a sports facility, that was previously frequented by the mobile device 101. Further, the explicit group that includes first mobile device 101 may be, for example, a soccer team that organizes their games using social media. This explicit group may play their games at a specific soccer field. Accordingly, the location of that field may be an example of an explicit group location. The implicit group may be all sports teams that organize on a given social media site. Accordingly, the implicit group location may include the soccer fields that are frequented by any of mobile devices included in these sports teams.

In this embodiment, if the database 305/630 includes the location that is associated with the first device 101 and that is within the intersection 410 or within the predetermined distance from the intersection 410, the server 307 sets the location associated with the first device as the refined location of the first mobile. For instance, referring back to FIG. 2, if multiple buildings 203$_1$ and 203$_j$ are found to be within the intersection 410 or within the predetermined distance from the intersection 410, the server 307 may determine whether there is a location associated with the first mobile device 101 that is located within the intersection 410 or within the predetermined distance from the intersection 410. If, for example, the building 203$_1$ is determined to be a gymnasium that the first mobile device 101 has previously frequented, the server 307 may set the building 203$_1$ as the refined location for first mobile device 101 and may send a signal to the display device 108 to display the refined location of the mobile device 101. In this embodiment, the server 307 may also update the database 305/630 to associate the refined location of the first mobile device 101 with the first mobile device 101. In some embodiments, the server 307 may update the database 305/630 to associate the refined location with each of the mobile devices 101, 301$_6$, 302$_5$, and 302$_6$ in the subgroup of mobile devices.

In another embodiment, the server 307 may refine the location of the mobile device 101 by triangulating based on the location data from each of the mobile devices 101, 301$_6$, 302$_5$, and 302$_6$ that in the subgroup to obtain a refined location of the first mobile device 101.

Figure 6:
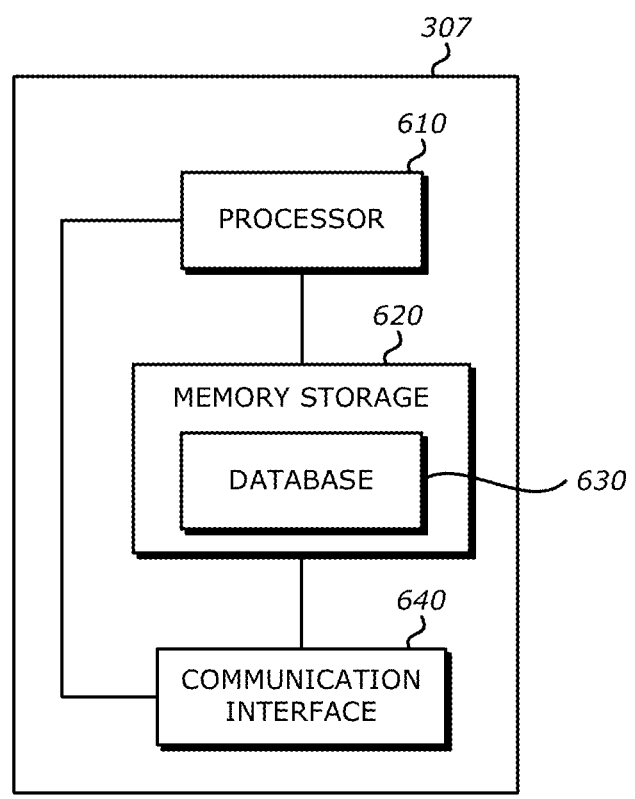
FIG. 6 illustrates exemplary components of a server in accordance with aspects of the present disclosure.

Referring to FIG. 6, which illustrates exemplary components of a server 307 in accordance with aspects of the present disclosure, the server 307 may include a processor 610, memory storage 620, and a communication interface 640.

The communication interface 640 is be a network communication interface that may include a wired network interface such as an IEEE 802.3 Ethernet interface as well as a wireless interface such as an IEEE 802.11 WiFi interface. Data may also be received from any one of a variety of different wireless communications networks and in accordance with any one of several different protocols. These include: a cellular mobile phone network (e.g. a Global System for Mobile communications, GSM, network), including current 2G, 3G, 4G, and LTE networks; and an IEEE 802.11 network (WiFi or Wireless Local Area Network, WLAN). In one embodiment, the communication interface 640 may receive location data and proximity information from each of the mobile devices, respectively. The location data received from a mobile device 101 may include the location 210, which is the fixed location of the mobile device 101. The proximity information received from the mobile device 101 may include an identification of mobile devices proximate in location to the mobile device 101. For instance, the mobile device 101 may provide the identification of mobile devices 301$_6$, 302$_5$, and 302$_6$ that are within a proximity sensitivity radius 406 of the mobile device 101. The communication interface 640 may also transmit a refined location of the mobile devices received from a processor 610 to a display device 108.

The processor 610 that is coupled to the communication interface 640 may include a microprocessor, a microcontroller, a digital signal processor, or a central processing unit, and other needed integrated circuits such as glue logic. The term "processor" may refer to a device having two or more processing units or elements, e.g. a CPU with multiple processing cores. The processor 640 may be used to control the operations of the communication interface 640. For example, the processor 640 may be coupled to the communication interface 640 and executes software to control the wireless network communications functionality of the server 307 (e.g. communicating with a network 106 to transmit and receive data to other components of system 300 (e.g., mobile devices) via the communication interface 640). In some cases, a particular function may be implemented as two or more pieces of software that are being executed by different hardware units of a processor.

In one embodiment, the processor 610 is also coupled to the memory storage 620 that may include one or more different types of storage such as hard disk drive storage, nonvolatile memory, and volatile memory such as dynamic random access memory. The memory storage 620 may also include a database 630 that stores location data associated with the plurality of mobile devices included in system 300. The database 630 may also store membership data in explicit or implicit groups, member or mobile device characteristics, location identification, other location related information, historical subgroup member data and location based subgroup data. The memory device 620 may also store instructions (e.g. software; firmware) which may be executed by the processor 610. In one embodiment, when the instructions stored in memory device 620 are executed by the processor 610, the processor 610 performs methods for increasing accuracy of a location determination of mobile devices within a location-based subgroup. In some embodiments, the processor 610 may receive the location data and the proximity information from the communication interface, form a subgroup of mobile devices based on the proximity information from each of the plurality of mobile devices, and refine the fixed location of the first mobile device to generate a refined location of the first mobile device 101. The processor 610 may also control the functions of the communication interface 640 by signaling to the communication interface 640 to request from each of the mobile devices in the system 300 their location data and proximity information and by signaling to the communication interface 640 to transmit the refined location of the first device 101 to the display device 108 to be displayed. The methods for increasing accuracy of a location determination of mobile devices within a location-based subgroup are discussed in further detail below.

In addition, various other peripheral units (not shown) may be connected to the server 307 to form a computer platform, such as but not limited to keyboards, mouse, additional data storage units, printing units and/or display units. The processor 610, memory storage 620, and communication interface 640 communicate to input devices and output devices via one or more communication links such as a bus. The communication links may also be other wired or wireless communication links. Though in FIG. 3, a single server 307 is shown, it is understood that the server 307 may be a virtual machine, with all the above capabilities, distributed over multiple servers or the cloud computing.

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 5A:
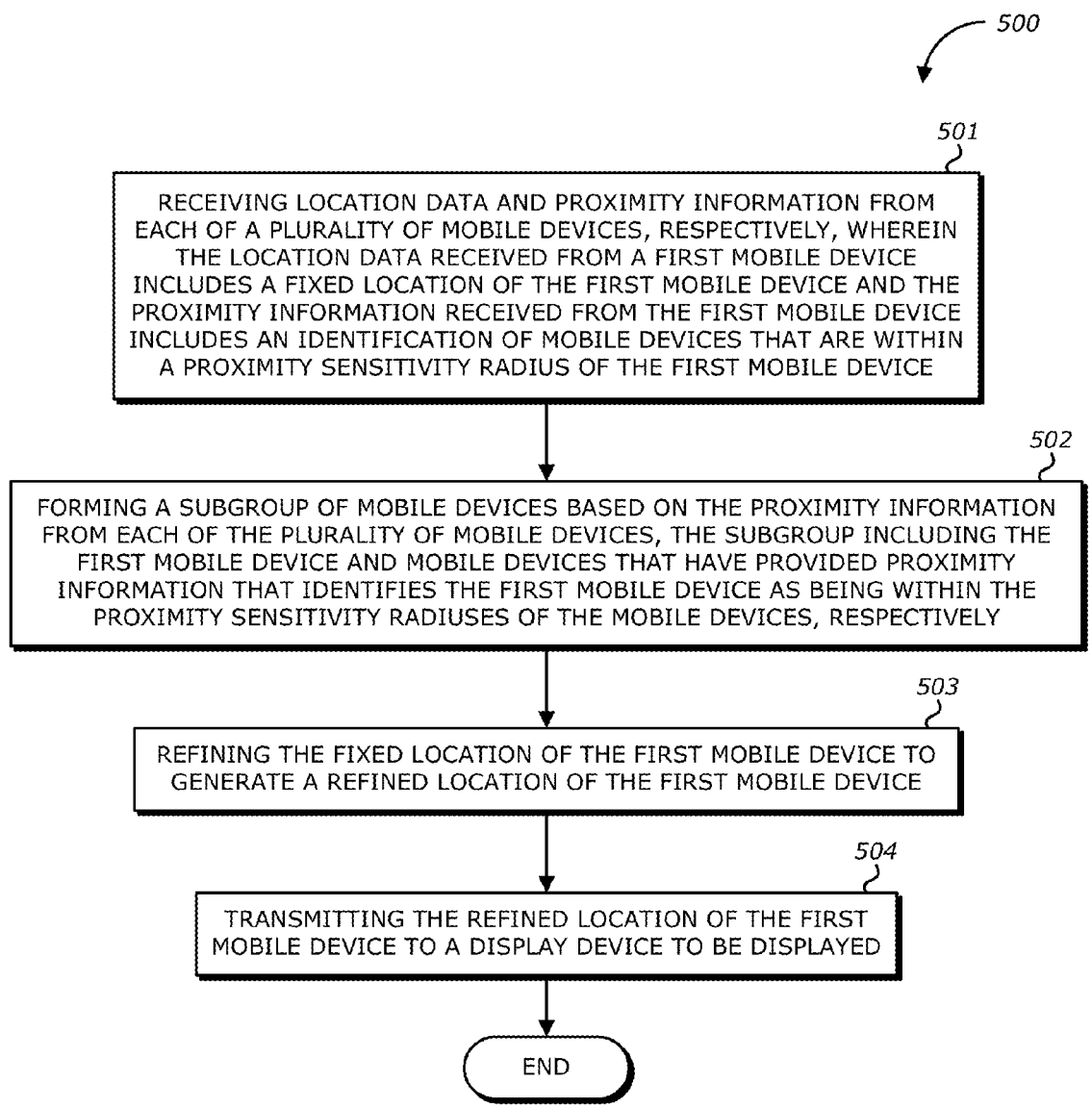
FIG. 5A illustrates a flow diagram of an example method for increasing accuracy of a location determination of mobile devices within a location-based subgroup according to an embodiment of the invention.

FIG. 5A illustrates a flow diagram of an example method for increasing accuracy of a location determination of mobile devices within a location-based subgroup according to an embodiment of the invention. The method 500 starts at Block 501 with the server 307 receiving location data and proximity information from each of a plurality of mobile devices, respectively. The location data received from a first mobile device 101 included in the mobile devices includes a fixed location of the first mobile device 101. The proximity information received from the first mobile device 101 includes an identification of mobile devices that are within a proximity sensitivity 406 radius of the first mobile device 101. At Block 502, the server 307 may form a subgroup of mobile devices based on the proximity information from each of the plurality of mobile devices. The subgroup may include the first mobile device and the mobile devices that have provided proximity information that identifies the first mobile device as being within the proximity sensitivity radiuses of the mobile devices, respectively. For instance, referring to FIG. 4, the proximity information from mobile device $301_6$ includes an identification of first mobile device 101 as being within mobile device $301_6$'s proximity sensitivity radius that creates the sensor accuracy limit (or area) 402. Similarly, proximity information from mobile device $302_5$ includes an identification of first mobile device 101 as being within the mobile device $302_5$'s proximity sensitivity radius that creates the sensor accuracy limit (or area) 403 and proximity information from mobile device $302_6$ includes an identification of first mobile device 101 as being within the mobile device $302_6$'s proximity sensitivity radius that creates the sensor accuracy limit (or area) 404. Accordingly, the subgroup being formed in FIG. 4 may include first mobile device 101 and mobile devices $301_6$, $302_5$, and $302_6$. At Block 503, the server 307 may refine the fixed location of the first mobile device 101 to generate a refined location of the first mobile device 101. At Block 504, the server 507 may transmit the refined location of the first mobile device to a display device 108 to be displayed on a display device 108.

Figure 5B:
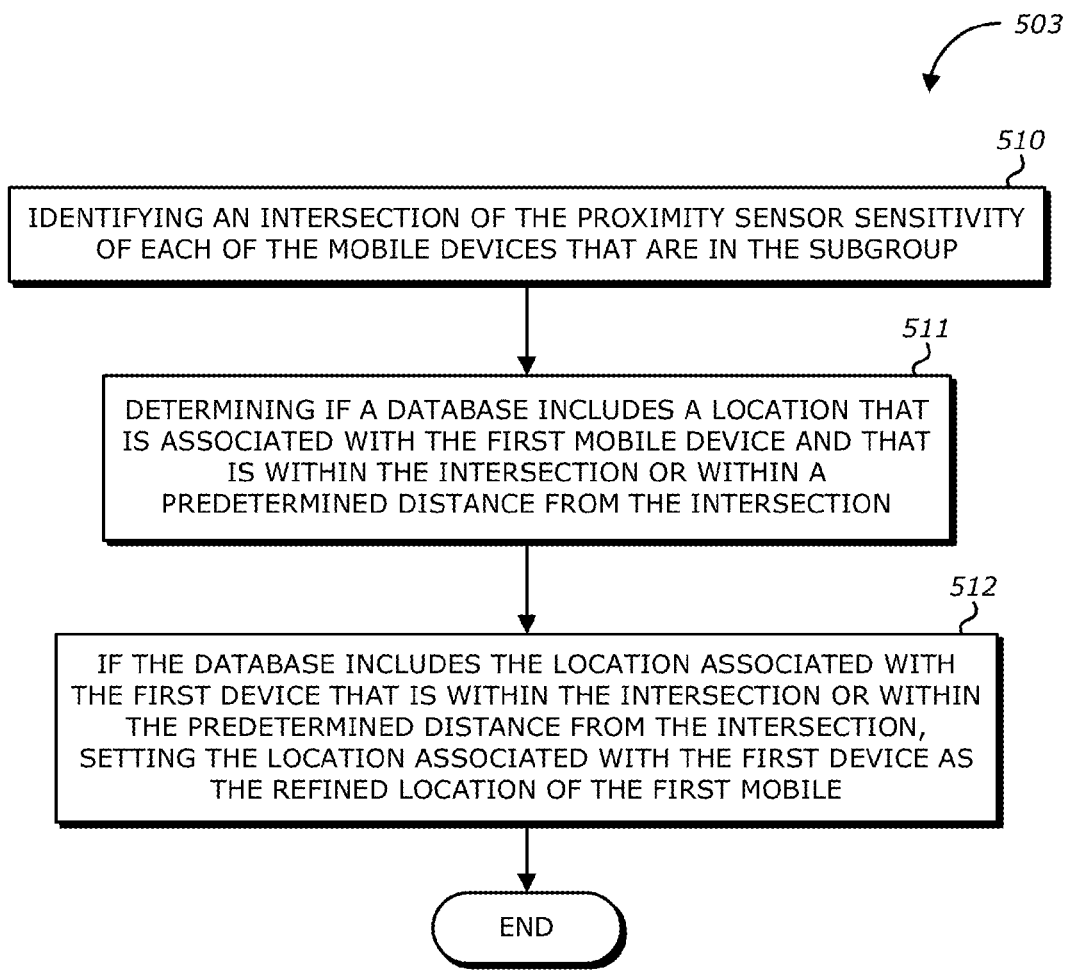
FIG. 5B illustrates a flow diagram of an example method for refining the location of a mobile device according to an embodiment of the invention.

FIG. 5B illustrates a flow diagram of an example method for refining the location of a mobile device according to an embodiment of the invention. In order to refine the location of the first mobile device 101 at Block 503 of FIG. 5A, the server 307 may identify an intersection 410 of the proximity sensor sensitivity of each of the mobile devices 101, $301_6$, $302_5$, and $302_6$ that in the subgroup at Block 510. At Block 511, the server 307 may determine if a database 305/630 includes a location associated with the first mobile device 101 that is within the intersection 410 or within a predetermined distance from the intersection 410 and at Block 512, if the database 305/630 includes the location associated with the first device 101 that is within the intersection 410 or within the predetermined distance from the intersection 410, the server 307 may set the location associated with the first device 101 as the refined location of the first mobile device 101. In one embodiment, the location associated with the first device 101 that is stored in the database 305/630 may include historic data on the first device 101's previously frequented locations. Accordingly, if the first device 101's previously frequented location falls within the intersection 410, the server 307 may set the previously frequented location as the refined location of the first mobile device.

Figure 5C:
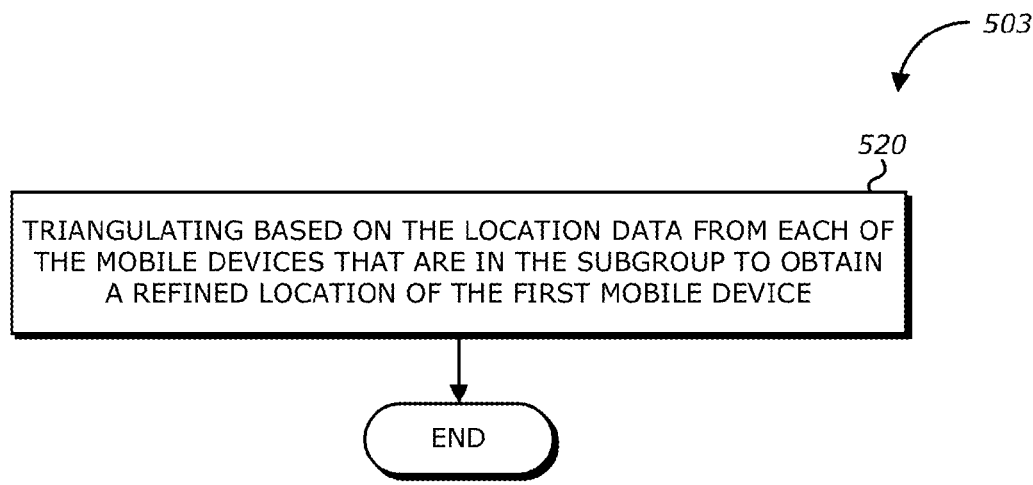
FIG. 5C illustrates a flow diagram of an example method for refining the location of a mobile device according to another embodiment of the invention.

FIG. 5C illustrates a flow diagram of an example method for refining the location of a mobile device according to another embodiment of the invention. In this embodiment, in order to refine the location of the first mobile device 101 at Block 503 of FIG. 5A, the server 307 may triangulate based on the location data from each of the mobile devices that in the subgroup to obtain a refined location of the first mobile device 101 (Block 520).

An embodiment of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A method of increasing accuracy of a location determination of mobile devices within a location-based subgroup comprising:

receiving, by a processor, location data and proximity information from each of a plurality of mobile devices, respectively, wherein the location data received from a first mobile device includes a fixed location of the first mobile device and the proximity information received from the first mobile device includes an identification of mobile devices that are within a proximity sensitivity radius of the first mobile device, wherein the proximity sensitivity radius of the first mobile device is defined by a proximity sensor included in the first mobile device, wherein the plurality of mobile devices includes the first mobile device;

forming by the processor a subgroup of mobile devices based on the proximity information from each of the plurality of mobile devices, the subgroup including the first mobile device and mobile devices that have provided proximity information that identifies the first mobile device as being within the proximity sensitivity radiuses of the mobile devices, respectively; and refining, by the processor, the fixed location of the first mobile device to generate a refined location of the first mobile device, wherein refining the fixed location includes identifying an intersection of the proximity sensitivity radiuses of each of the mobile devices that are in the subgroup.

2. The method of claim 1, wherein the refining the fixed location of the first mobile device further comprises: determining by the processor, if a database includes a location associated with the first mobile device that is within the intersection or within a predetermined distance from the intersection; and if the database includes the location associated with the first device that is within the intersection or within the predetermined distance from the intersection, setting the location associated with the first device as the refined location of the first mobile.

3. The method of claim 2, wherein the location associated with the first device includes at least one of (i) an explicit group location that is associated with an explicit group that includes the first mobile device, (ii) an implicit group location that is associated with an implicit group that includes the first mobile device, and (iii) a historic location that is associated with the first mobile device, wherein the historic location is a location previously frequented by the first mobile device.

4. The method of claim 1, wherein the refining, by the processor, the location of the first mobile device further comprises: triangulating based on the location data from each of the mobile devices that in the subgroup to obtain a refined location of the first mobile device.

5. The method of claim 1, further comprising updating a database to associate the refined location of the first mobile device with the first mobile device.

6. The method of claim 1, further comprising: transmitting the refined location of the first mobile device to a display device to be displayed on a display device.

7. An apparatus for increasing accuracy of a location determination of mobile devices within a location-based subgroup comprising:
a processor;
a communication interface to:
receive a location data and proximity information from each of a plurality of mobile devices, respectively, wherein the location data received from a first mobile device includes a fixed location of the first mobile device and the proximity information received from the first mobile device includes an identification of mobile devices that are within a proximity sensitivity radius of the first mobile device, wherein the proximity sensitivity radius of the first mobile device is defined by a proximity sensor included in the first mobile device, wherein the plurality of mobile devices includes the first mobile device; and a memory storage storing instructions that, when executed by the processor, causes the processor to:

receive the location data and the proximity information from the communication interface, form a subgroup of mobile devices based on the proximity information from each of the plurality of mobile devices, the subgroup including the first mobile device and mobile devices that have provided proximity information that identifies the first mobile device as being within the proximity sensitivity radiuses of the mobile devices, respectively, and refine the fixed location of the first mobile device to generate a refined location of the first mobile device, wherein refining the fixed location includes identifying an intersection of the proximity sensitivity radiuses of each of the mobile devices that are in the subgroup.

8. The apparatus of claim 7 further comprising: a database storing data associated with a plurality of mobile devices, wherein, when the processor executes the instructions stored in memory, the processor refines the fixed location of the first mobile device by: determining if the database includes a location associated with the first mobile device that is within the intersection or within a predetermined distance from the intersection, and if the database includes the location associated with the first device that is within the intersection or within the predetermined distance from the intersection, setting the location associated with the first device as the refined location of the first mobile.

9. The apparatus of claim 8, wherein the location associated with the first device includes at least one of (i) an explicit group location that is associated with an explicit group that includes the first mobile device, (ii) an implicit group location that is associated with an implicit group that includes the first mobile device, and (iii) a historic location that is associated with the first mobile device, wherein the historic location is a location previously frequented by the first mobile device.

10. The apparatus of claim 7, wherein, when the processor executes the instructions stored in memory, the processor refines the fixed location of the first mobile device by: triangulating based on the location data from each of the mobile devices that in the subgroup to obtain a refined location of the first mobile device.

11. The apparatus of claim 7, wherein when the processor executes the instructions stored in memory, the processor further: update a database to associate the refined location of the first mobile device with the first mobile device.

12. The apparatus of claim 7, when the processor executes the instructions stored in memory, the processor further: signals to the communication interface to transmit the refined location of the mobile device to a display device.

13. A non-transitory computer-readable medium having stored thereon instructions that, when executed by a processor, causes the processor to perform a method of increasing accuracy of a location determination of mobile devices within a location-based subgroup comprising:
receiving location data and proximity information from each of a plurality of mobile devices, respectively, wherein the location data received from a first mobile device includes a fixed location of the first mobile device and the proximity information received from the first mobile device includes an identification of mobile devices that are within a proximity sensitivity radius of the first mobile device, wherein the proximity sensitivity radius of the first mobile device is defined by a proximity sensor included in the first mobile device, wherein the plurality of mobile devices includes the first mobile device;

forming a subgroup of mobile devices based on the proximity information from each of the plurality of mobile devices, the subgroup including the first mobile device and mobile devices that have provided proximity information that identifies the first mobile device as being within the proximity sensitivity radiuses of the mobile devices, respectively; and refining the fixed location of the first mobile device to generate a refined location of the first mobile device, wherein refining the fixed location includes identifying an intersection of the proximity sensitivity radiuses of each of the mobile devices that are in the subgroup.

14. The non-transitory computer-readable medium of claim 13, wherein the refining the fixed location of the first mobile device further comprises: determining by the processor, if a database includes a location associated with the first mobile device that is within the intersection or within a predetermined distance from the intersection; and if the database includes the location associated with the first device that is within the intersection or within the predetermined distance from the intersection, setting the location associated with the first device as the refined location of the first mobile.

15. The non-transitory computer-readable medium of claim 14, wherein the location associated with the first device includes at least one of (i) an explicit group location that is associated with an explicit group that includes the first mobile device, (ii) an implicit group location that is associated with an implicit group that includes the first mobile device, and (iii) a historic location that is associated with the first mobile device, wherein the historic location is a location previously frequented by the first mobile device.

16. The non-transitory computer-readable medium of claim 13, wherein the refining, by the processor, the location of the first mobile device further comprises: triangulating based on the location data from each of the mobile devices that in the subgroup to obtain a refined location of the first mobile device.

17. The method of claim 13, further comprising updating a database to associate the refined location of the first mobile device with the first mobile device.

18. The non-transitory computer-readable medium of claim 13, further comprising: transmitting the refined location of the first mobile device to a display device to be displayed on a display device.

* * * * *